United States Patent [19]

Anderson

[11] Patent Number: 4,806,783
[45] Date of Patent: Feb. 21, 1989

[54] TRANSDUCER CIRCUIT

[75] Inventor: Richard S. Anderson, Chatsworth, Calif.

[73] Assignee: Transducer Technologies Inc., Pasadena, Calif.

[21] Appl. No.: 160,256

[22] Filed: Feb. 25, 1988

[51] Int. Cl.$^4$ .............................................. H01G 7/00
[52] U.S. Cl. .................................... 307/118; 361/283; 73/724
[58] Field of Search ........................ 307/118; 361/283; 73/718, 724

[56] References Cited

U.S. PATENT DOCUMENTS

| | | | |
|---|---|---|---|
| 3,356,963 | 12/1967 | Buck | 361/283 X |
| 3,753,373 | 8/1973 | Brown | 361/283 X |
| 3,993,939 | 11/1976 | Slavin et al. | 361/283 |
| 4,064,549 | 12/1977 | Cretzler | 361/283 |
| 4,168,518 | 9/1979 | Lee | 361/283 |
| 4,177,496 | 12/1979 | Bell et al. | 361/283 |
| 4,184,189 | 1/1980 | Davis et al. | 361/283 |
| 4,227,419 | 10/1980 | Park | 361/283 X |
| 4,287,553 | 9/1981 | Braunlich | 361/283 |
| 4,301,492 | 11/1981 | Paquin et al. | 361/283 |
| 4,466,289 | 8/1984 | Lam | 73/718 X |
| 4,490,773 | 12/1984 | Mofatt | 361/283 |
| 4,517,622 | 5/1985 | Male | 361/283 |

Primary Examiner—William M. Shoop, Jr.
Assistant Examiner—Sharon D. Logan
Attorney, Agent, or Firm—William W. Haefliger

[57] ABSTRACT

Apparatus for producing output signal changes corresponding to fluid pressure changes includes:
(a) a transducer responsive to applied input pressure changes to produce capacitance changes at a variable capacitor,
(b) a first circuit to produce a cyclic wave, and connected with the variable capacitor,
(c) a second circuit including a switch to connect the capacitor to ground when the cyclic wave is at a first level, thereby to charge the variable capacitor, and to connect the variable capacitor to a second capacitor when the cyclic wave is at a second level, whereby the charge becomes distributed on the variable and second capacitors, and whereby a sawtooth signal is produced at a junction associated with the capacitors,
(d) an operational amplifier electrically coupled with that junction for integrating the sawtooth signal to produce a first output voltage,
(e) the first circuit including a voltage controlled oscillator having an input side coupled with the output side of the operational amplifier thereby to produce the output signal in the form of a frequency which varies as a function of the first output voltage and which corresponds to the cyclic wave,
(f) stray capacitance being introduced by electrical connections associated with the transducer and the second circuit, and including a third circuit operatively connected with second circuit for masking the effect of stray capacitance,
(g) the second circuit including resistance connected between a source of DC voltage and the junction.

9 Claims, 2 Drawing Sheets

4,806,783

TRANSDUCER CIRCUIT

BACKGROUND OF THE INVENTION

This invention relates generally to pressure responsive transducers, and associated circuitry for converting pressure changes into frequency changes.

There is continuing need for simple, effective, high pressure responsive transducers, and associated circuitry, characterized by linearity of varying response to applied fluid pressure changes. Prior devices in general did not incorporate the unusually advantageous structure, functions and results as are found in the device of the present invention. Known related devices are disclosed in U.S. Pat. Nos. 4,064,549 to Cretzler; 4,168,518 to Lee; 4,177,496 to Bell: 4,184,189 to Davis et al; 4,287,553 to Braunlich; and 4,301,492 to Paquin.

SUMMARY OF THE INVENTION

It is a major object of the invention to provide improved pressure responsive transducer circuitry for converting applied pressure changes into frequency changes, and wherein a capacitance change type transducer component is employed. Basically, the transducer apparatus of the invention comprises:
  (a) transducer means responsive to applied input pressure changes to produce capacitance changes at a variable capacitor,
  (b) first circuit means to produce a cyclic wave, and connected with the variable capacitor,
  (c) second circuit means including a switch (generally electronic) to connect the capacitor to ground when the cyclic wave is at a first level, thereby to charge the variable capacitor, and to connect the variable capacitor to a second capacitor when the cyclic wave is at a second level, whereby the charge becomes distributed on the variable and second capacitor, and whereby a sawtooth signal is produced at a junction associated with said capacitor,
  (d) an operational amplifier electrically coupled with said junction for integrating said sawtooth signal to produce a first output voltage,
  (e) said first circuit means including a voltage controlled oscillator having an input side coupled with the output side of the operational amplifier thereby to produce said output signal in the form of a frequency which varies as a function of the first output voltage, said frequency corresponding to said cyclic wave.

Typically, stray capacitance is introduced by electrical connections associated with the transducer means, and second circuit means, producing non-linearity, which is compensated for by introduction or inclusion of third circuit means operatively connected with said second circuit means for masking the effect of said stray capacitance. That third circuit means typically includes an active circuit element and a third capacitance, both connected across the variable capacitance to cause the charge on the third capacitance to assume polarities opposite to the polarities of the charges on the variable capacitance.

Further, the transducer means advantageously includes first and second quartz (or other materials) elements, the variable capacitor defined by capacitor plates on such elements, with a gap therebetween, and means carrying the elements so that applied pressure deflects one element and the plate thereon toward the other element and the plate thereon. Such element may be disc shaped, or generally cylindrical, as will be seen.

These and other objects and advantages of the invention, as well as the details of an illustrative embodiment, will be more fully understood from the following specification and drawings, in which:

DRAWING DESCRIPTION

FIG. 1 is a circuit diagram;
FIG. 1a is a circuit diagram;
FIG. 2 is a plan view of a transducer;
FIG. 3 is a section taken on lines 3—3 of FIG. 2, together with a in section;
FIG. 4 is a side elevation of a second transducer; and
FIG. 5 is a section taken on lines 5—5 of FIG. 4, together with a housing, in section.

DETAILED DESCRIPTION

Figure 1:
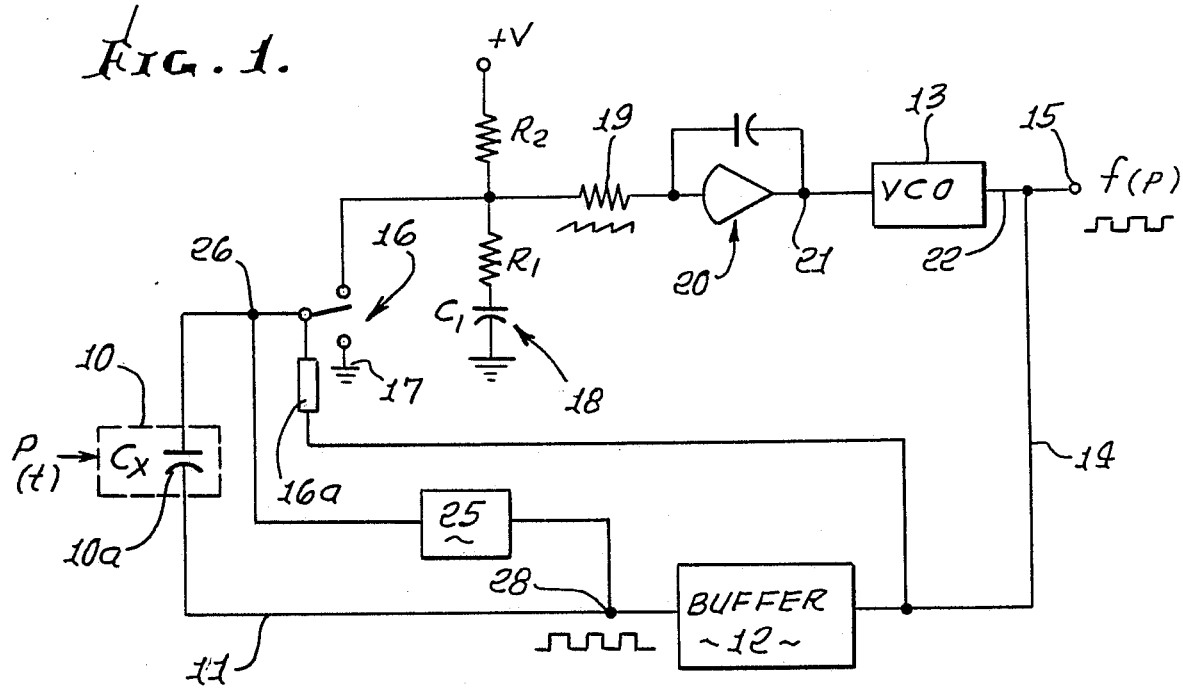

The circuit of FIG. 1 includes a variable capacitor 10a which is part of a pressure transducer 10 receiving pressure application P. Its capacitance is designated $C_x$. One plate of the capacitor is connected at 11 with a buffer circuit 12 switch (amplitude varies as $+V$) and receives a time varying square wave signal, as shown, from the buffer. Merely by way of example, the DC levels of the square wave are 0 and $+8$ volts (nominal). First circuit means to produce that cyclic wave may be considered to include the voltage controlled oscillator (VCO) 13 and the buffer 12, the output of the VCO connected at 14 with the buffer input, and the references voltage $+V$ also connected to buffer 12 to control amplitude of the buffer output. Note also the circuit output terminal 15 at which output f(p) appears, i.e. a frequency which varies with pressure P.

A second circuit means is provided to include a switch 16, generally electronic, to connect the capacitor upper plate to ground 17 when the cyclic wave input to the capacitor is at a first level ($+8$ volts for example) thereby to charge the variable capacitor 10a, and to connect the variable capacitor upper plate to the upper plate of a second capacitor 18 just before the cyclic wave is at another level (0 volts, for example). A switch driver appears at 16a. As a result, the charge received by capacitor 10a is distributed on the upper plates of capacitor 10a and capacitor 18. The capacitance of 18 is substantially larger than that of 10a, whereby a negative voltage step equal to $$\frac{C_x}{C_x + C_1}.$$

($+8$ volts) occurs at the summing node or junction 19.

The current flowing through $R_2$ as shown causes the voltage at 19 to have a continually increasing ramp. This in combination with the negative voltage steps as described, causes the voltage at 19 to have sawtooth wave form.

That sawtooth is integrated by an operational amplifier 20, to produce a first output voltage at 21. Any average DC component change at 19 therefore results in a change of the voltage at the output 21. Also, any change at 19 causes a change in the frequency output at 22 of the VCO 13, which in turn changes the frequency of the cyclic signal applied to capacitor 10a via the buffer. At equilibrium, the frequency f(p) at terminal 15 equals $1/R_1 C_x$.

Now, $$C_x = \frac{K_1}{T - K_2P} \qquad (1)$$

where, $K_1$ and $K_2$ are constants,

P = pressure applied to 10a

T = a constant related to the geometry of the variable capacitor whereby f(p) is a linear function of P. In actual practice, the wiring in the circuit between 26 and 11 produces stray capacitance $C_p$ in parallel with $C_x$. Including this term is the above equation yields:

$$C_x = \frac{K_1}{T - K_2P} = C_p = \frac{K_1 + C_p(T - K_2P)}{T - K_2P} \qquad (2)$$

and, $$f = \frac{1}{R_1 C_x} = \frac{T - K_2P}{K_1 R_1 + C_p R_1 (T - K_2P)} \qquad (3)$$

The additional term in the denominator of the right side of equation (3) creates a non-linear relationship between f and P.

In accordance with an important aspect of the invention, third circuit means 25 is provided to be operatively connected with the second circuit means, as at 26, for masking the effect of the stray capacitance. As shown, circuit means 25 is also connected to the lead 11, at point 28, whereby it is connected across capacitor 10a.

Figure 1A:
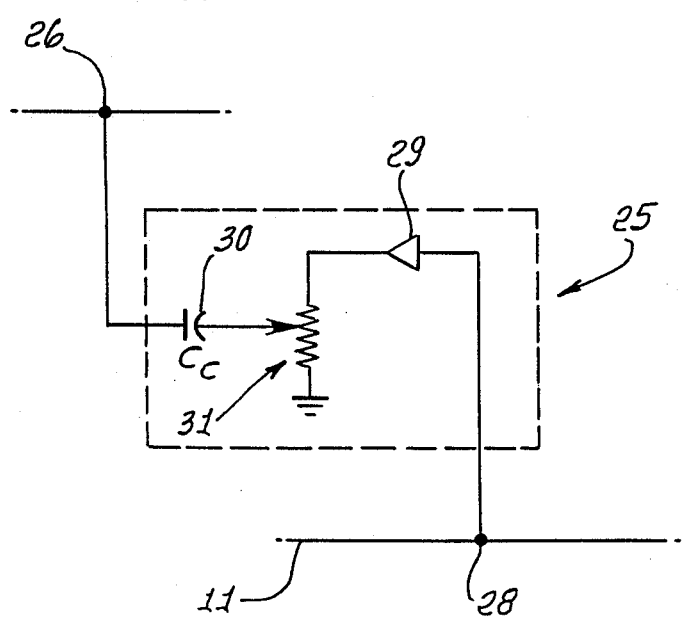

More specifically, and as shown in FIG. 1a, the third circuit means advantageously includes an active circuit element, such as auxiliary amplifier 29, and a third capacitor 30 (of capacitance $C_c$) connected between the output side of 29 and point 26, as shown. Note also trim potentiometer 31 coupled between 30 and 29. This causes the third capacitor 30 to assume a polarity opposite to the polarity of the charge on capacitor 10a. In other words, the output of amplifier 29 is a square wave whose frequency and amplitude are the same as those used to charge 10a, but whose polarities are reversed relative to the polarities of the square wave applied to 10a. The total charge by the combination of $C_x$, $C_p$ and $C_c$, is then:

$$Q_x = C_x V + C_p V - C_c KV \qquad (4)$$

where $0 < K < 1$, determined by the setting of the potentiometer 31. By proper adjustment of 31, the second and third terms on the right side of the equation (4) can be made to cancel, thereby compensating for the non-linearity caused by $C_p$.

Figure 2:
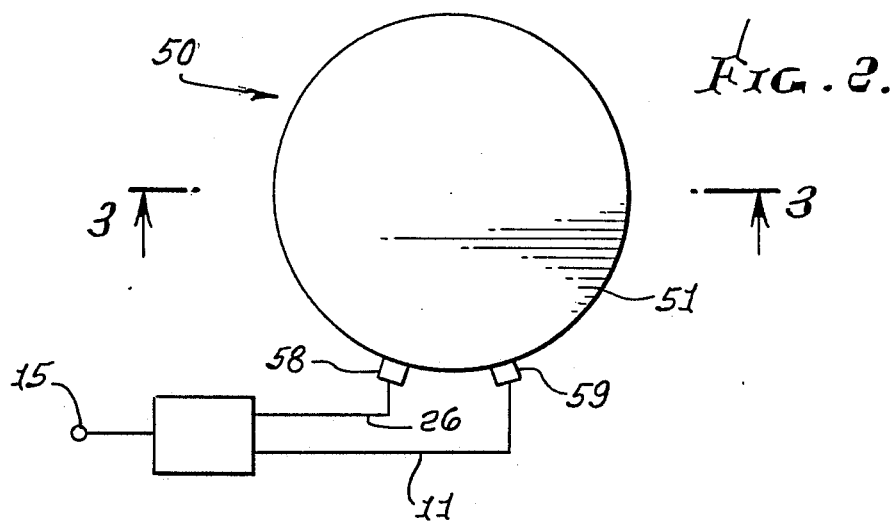
Figure 3:
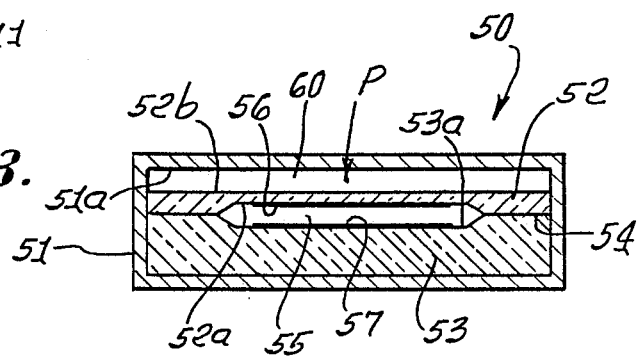

Referring to FIGS. 2 and 3, a generally disc shaped transducer 50 consists of quartz, and is located within housing 51. The transducer includes two quartz elements 52 and 53 which are generally disc shaped, and stacked together. The two elements are integrally interconnected, annularly, at zone 54, as by fusion. For example, a glass frit in a suitable carrier ay be applied to the element surfaces, in an annular band, and the element then baked at elevated temperature sufficient to produce fusion.

A thin disc shaped gap 55 is located between the element surfaces 52a and 53a, and for that purpose the intervening frit creates a gap shown. For example, glass frit in a suitable volatile carrier vehicle (hydrocarbon) may be applied to the element surfaces, in annular bands, and the elements then baked at elevated temperature (800° F.) sufficient to produce fusion. In this regard, the frit and its carrier may be embodied in a controlled thickness sheet, used to control gap thickness. Capacitor plates 56 and 57 are applied to surfaces 52a and 53a, as by application of thin layers of electrically conductive ink. Thin conductive tabs 58 and 59 are respectively in contact with the plates 56 and 57, and extend radially to the exterior, for electrical connection to circuit elements 26 and 11, previously described.

Fluid (gas) pressure applied to the external surface 52b of element 52 deflects that diaphragm portion of element 52 carrying plate 56 toward plate 57 to vary the capacitance of the transducer as a function of pressure. Note the pressure plenum or space 60 between the surface 52b and wall 51a of the housing 51. A pressure access opening appears at 61.

Figure 4:
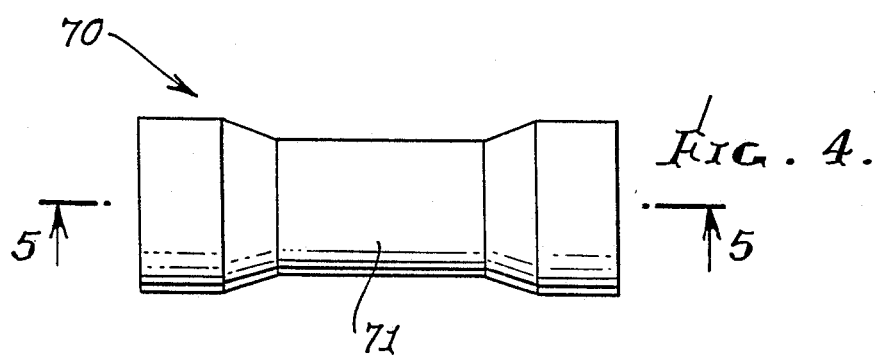
Figure 5:
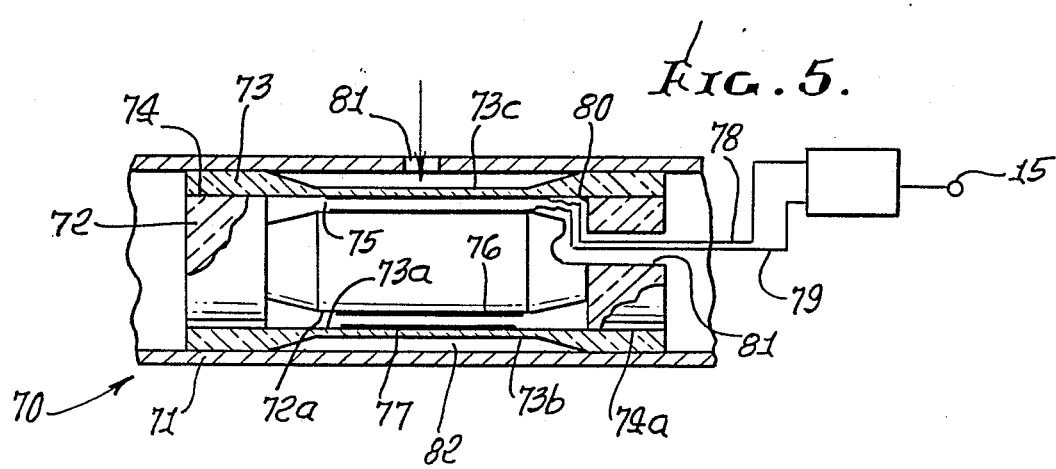

The transducer 70 shown in FIG. 4 is generally cylindrical and elongated. It consists of quartz, and is located within a housing 71, seen in FIG. 5. It includes two quartz elements 72 and 73, element 72 being a rod received coaxially within a sleeve 73. The two elements are annularly integrally interconnected, at axially spaced zones 74 and 74a, as by fusion.

A thin cylindrical gap 75 is located between the element surfaces 72a and 73a, and for that purpose, element 72 may be preliminarily annularly recessed, as shown. Capacitor plates 76 and 77 in coaxial cylindrical form are applied to surfaces 72a and 73a, as by sputtering of metal (such as platinum or other). Conductive metallic leads 78 and 79 are respectively in contact with the two plates, and extend to the exterior, via passages 80 and 81 in element 72, for electrical connection to circuit elements 26 and 11.

Fluid (gas) pressure applied to the exterior surface 73b of element 73 deflects the diaphragm portion 73c of the element carrying plate 77, toward plate 76, to vary the capacitance of the transducer as a function of pressure. Note the pressure plenum or space 82 between surface 73b and wall 71a of the housing 71. A pressure access opening appears at 81.

I claim:

1. Apparatus for producing output signal changes corresponding to fluid pressure changes, comprising:
    (a) transducer means responsive to applied input pressure changes to produce capacitance changes at a variable capacitor,
    (b) first circuit means to produce a cyclic wave, and connected with the variable capacitor,
    (c) second circuit means including a switch to connect the variable capacitor to ground when the cyclic wave is at a first level, thereby to charge the variable capacitor, and to connect the variable capacitor to a second capacitor when the cyclic wave is at a second level, whereby the charge becomes distributed on the variable and second capacitors, and whereby a sawtooth signal is produced at a junction associated with said capacitors,
    (d) an operational amplifier electrically coupled with said junction for integrating said sawtooth signal to produce a first output voltage,
    (e) said first circuit means including a voltage controlled oscillator having an input side coupled with the output side of the operational amplifier thereby to produce said output signal in the form of a frequency which varies as a function of the first output voltage, said frequency corresponding to said cyclic wave, (f) stray capacitance being introduced by electrical connections associated with said transducer means and said second circuit means, and including third circuit means operatively connected with said second circuit means for masking the effect of said stray capacitance, (g) the second circuit means including resistance connected between a source of DC voltage and said junction.

2. The combination of claim 1 wherein said third circuit means is connected across said variable capacitor.

3. The combination of claim 2 wherein said third circuit means includes an active circuit element and a third capacitance, both connected across said variable capacitor to cause the charge on the third capacitance to assume polarities opposite to the polarities of the charges on the variable capacitance.

4. The combination of claim 3 wherein said active element comprises an auxiliary amplifier, the third capacitance connected between the output side of the auxiliary amplifier and the switch side of the variable capacitor.

5. The combination of claim 1 including a switch driver connected to the output side of the voltage controlled oscillator.

6. The combination of claim 1 wherein said transducer means includes first and second elements, said variable capacitor defined by capacitor plates on said elements, with a gap therebetween, and means carrying said elements so that applied pressure deflects one element and the plate thereon toward the other element and the plate thereon.

7. The combination of claim 6 wherein said elements are disc shaped, and fused together at locations spaced from said gap.

8. The combination of claim 6 wherein said elements respectively comprise a sleeve and a rod received within the sleeve, the rod and sleeve fused together at locations spaced from said gap.

9. Apparatus for producing output signal changes corresponding to fluid pressure changes, comprising:

(a) transducer means responsive to applied input pressure changes to produce capacitance changes at a variable capacitor, (b) first circuit means to produce a cyclic waveform, and connected with the variable capacitor, (c) second circuit means including a switch to connect the variable capacitor to ground when the cyclic wave is at a first level, thereby to charge the variable capacitor, and to connect the variable capacitor to a second capacitor when the cyclic waveform is at a second level, whereby the charge becomes distributed on the variable and second capacitors, and whereby a sawtooth signal is produced at a junction associated with said capacitors, (d) an operational amplifier electrically coupled with said junction for integrating said sawtooth signal to produce a first output voltage, (e) said first circuit means including a voltage controlled oscillator having an input side coupled with the output side of the operational amplifier thereby to produce said output signal in the form of a frequency which varies as a function of the first output voltage, said frequency corresponding to said cyclic waveform, (f) said operational amplifier being the only operational amplifier coupled between said junction and said voltage controlled oscillator, (g) and an auxiliary amplifier, and third capacitor connected across said variable capacitor.

* * * * *